United States Patent [19]
Grubb et al.

[11] 3,762,798
[45] Oct. 2, 1973

[54] MICROSCOPE STAGE

[75] Inventors: John J. Grubb, La Habra; Keichi Tomei, Monterey Park, both of Calif.

[73] Assignee: Hamilton Company, Whittier, Calif.

[22] Filed: July 1, 1971

[21] Appl. No.: 158,960

[52] U.S. Cl. ................................ 350/86, 350/90
[51] Int. Cl. ................................ G02b 21/26
[58] Field of Search .............................. 350/86, 90

[56] References Cited
UNITED STATES PATENTS
3,352,026  11/1967  Elwell ........................ 350/90 UX
2,265,182  12/1941  Mestre ............................ 350/90

FOREIGN PATENTS OR APPLICATIONS
446,677  3/1949  Italy ................................ 350/86
1,403,270  5/1965  France ............................ 350/86
3,092  2/1906  Great Britain .................... 350/86

Primary Examiner—David H. Rubin
Attorney—J. Carroll Baisch

[57] ABSTRACT

A supplementary microscope stage for attachment to a microscope table on which a specimen plate for a plurality of annularly-arranged and spaced specimens or samples for microscopic examination is rotatably mounted. The supplementary stage has at least one upstanding pivot pin on which the specimen plate is rotatably disposed. The pivot pin is adjustable to various positions from a normal position to bring various parts of the respective specimens or samples into view by the lens of the microscope.

2 Claims, 7 Drawing Figures

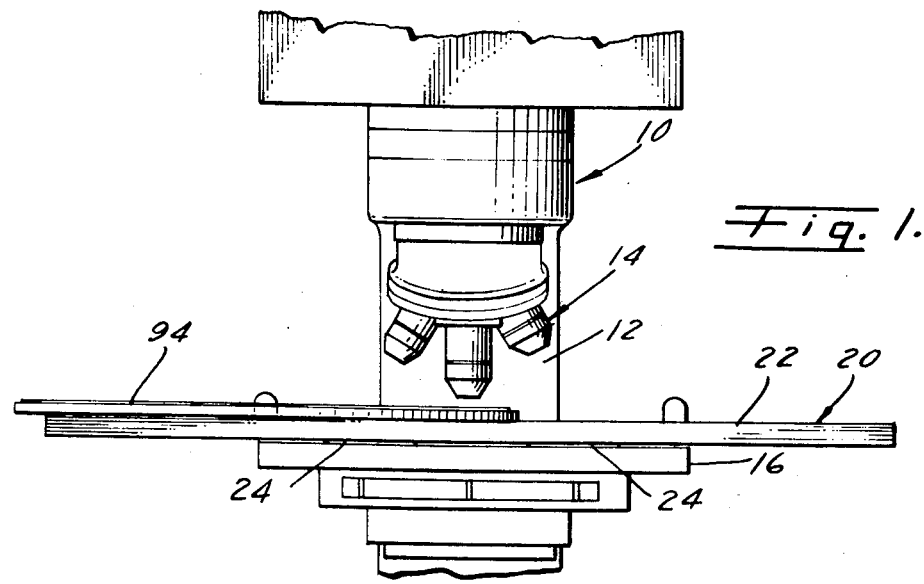
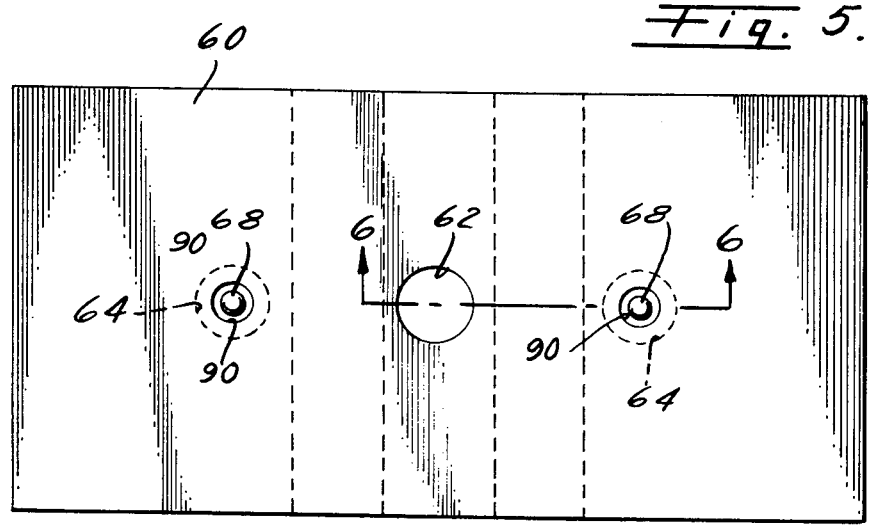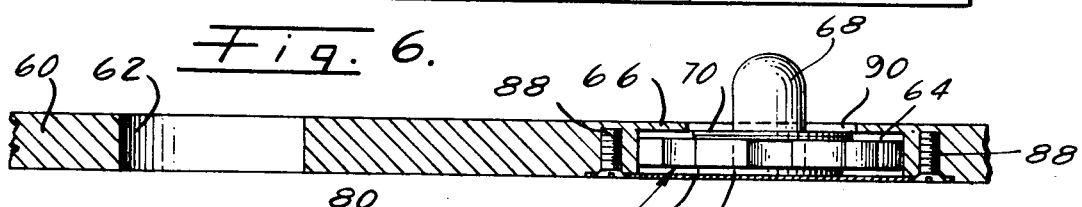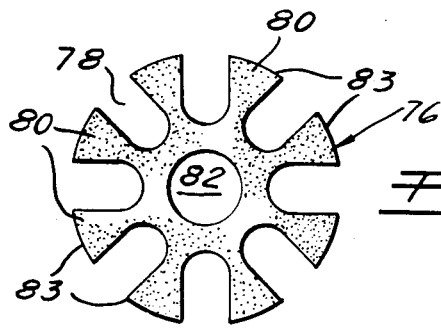
John J. Grubb, & Keichi Tomei, INVENTORS.

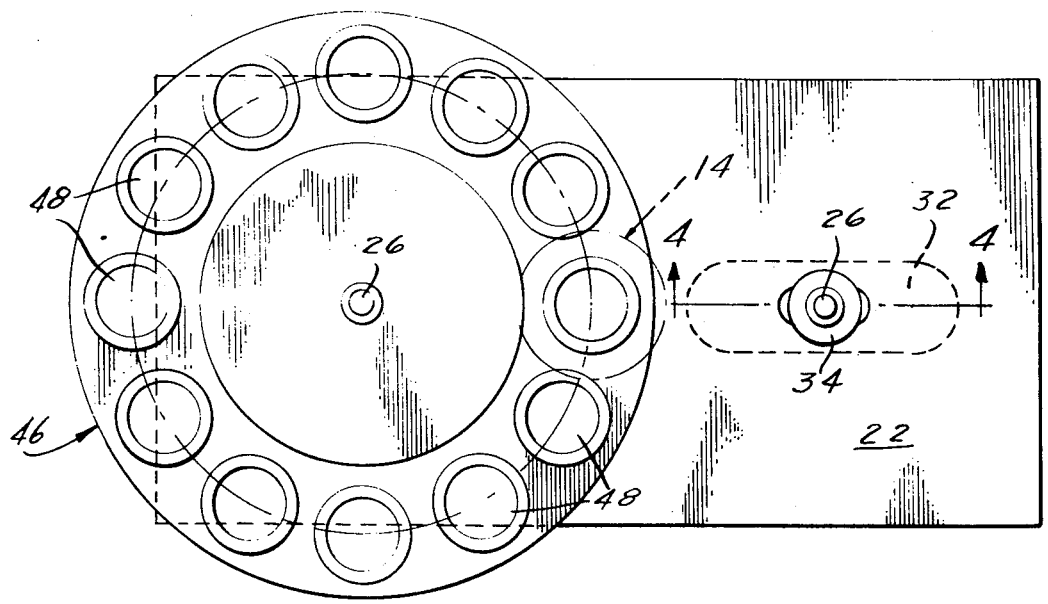
Fig. 2.
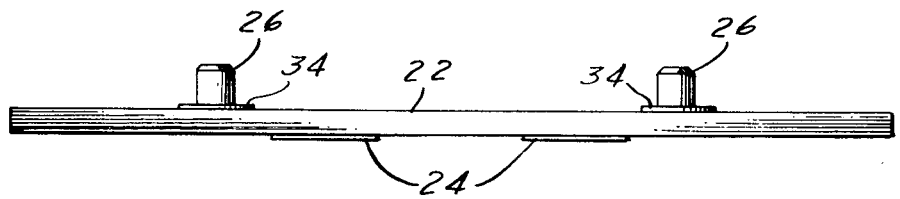
Fig. 3.
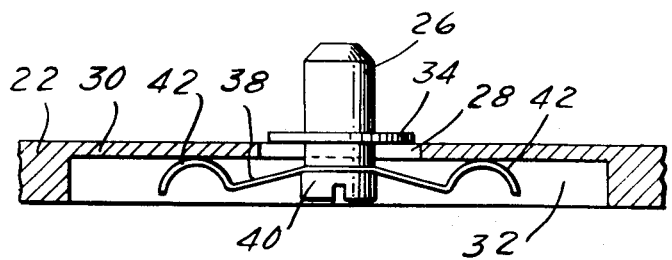
Fig. 4.
John J. Grubb, &
Keichi Tomei,
INVENTORS.
BY 
Attorney

MICROSCOPE STAGE

BACKGROUND OF THE INVENTION

1. Field of the Invention

This invention relates, generally, to stages for microscopes and relates, more particularly, to a supplementary stage on which specimen plates may be mounted.

2. Description of the Prior Art

Prior art microscopes have a fixed table or stage on which a flat glass slide with an object thereon is placed. Should the slide be moved, even slightly, it is almost impossible to get the same field in view and, should different persons examine the specimen, accurate confirmation of the examinations by different persons will be almost impossible. There are, of course, other disadvantages in the prior-art devices.

SUMMARY OF THE INVENTION

While the present invention is shown and described herein as a supplemental stage that is attached to the table of conventional microscopes, it is to be understood that the tables of prior-art microscopes may be eliminated and the present stage substituted therefor.

The present stage, which may be termed the supplementary stage, comprises a plate adapted to be attached to the table or stage of prior-art microscopes.

In one arrangement, the stage has a pair of recesses in the underside thereof, said recesses being spaced apart longitudinally of the plate. Each recess is defined at the top by a wall of reduced thickness relative to the thickness of the plate and there is an elongated slot in said wall.

There is an upstanding pin slidably disposed in each slot and yielding means in the respective recesses frictionally engage the underside of the wall of reduced thickness and frictionally retain the respective pins in whatever position they are moved to in the respective slots. Each pin is adapted to provide a pivot pin receivable in an axial opening of a specimen plate so that the plate is rotatable on its pin.

The plate is provided with a plurality of annularly-arranged and spaced specimen-receiving areas which are adapted to be brought into alignment with the lens or lens assembly of the microscope. The plate is rotated by the hand of the operator.

Should it be desired to bring different parts of an area having a sample into alignment with the microscope lens or lens assembly, the plate may be manually moved to cause the pin to move within the slot. The pin will, of course, be retained in an adjusted position by the resilient means frictionally engaging the underside of the wall part of reduced thickness.

In another arrangement, the pin may extend through a circular opening in the wall part of reduced thckness and, what may be termed herein "a spring," will center the pin in this opening. The specimen plate may be moved to cause the pin to move out of its axial position in the circular opening, to vary the field brought into alignment with the microscope lens. When the plate is released the spring will move the pin to its normal position.

OBJECTS AND ADVANTAGES OF THE INVENTION

It is an object of the present invention to provide a supplementary microscope stage that is easily mounted on stages of prior-art microscopes.

It is another object of the invention to provide a pivot pin for the stage on which a specimen plate may be rotatably mounted.

It is still another object of the invention to provide a device or apparatus of this character wherein the pins are movable so that a greater area of the microscopic field can be covered.

It is a further object of the invention to provide a device of this character whereby the microscopic field can be standardized.

A still further object of the invention is to provide a device or apparatus of this character wherein the specimen plate may be rotated on a fixed axis to give a uniform coverage of the microscopic fields so that every specimen may receive equal coverage.

Another object of the invention is to provide a device or apparatus of this character having a pair of pivot pins so that specimen plates can be used from either the right or the left side.

The characteristics and advantages of the invention are further sufficiently referred to in connection with the following detailed description of the accompanying drawings, which represent certain embodiments. After considering these examples, skilled persons will understand that many variations may be made without departing from the principles disclosed and we contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a front view of a portion of the microscope with the present invention attached to the table or stage thereof;

FIG. 2 is a top plan view of a stage embodying the present invention with a specimen plate operably disposed on one of the pivot pins;

FIG. 3 is a front-elevational view of a stage embodying the present invention;

FIG. 4 is a sectional view taken on line 4—4 of FIG. 2;

FIG. 5 is a top plan view of an alternative arrangement;

FIG. 6 is an enlarged sectional view taken on line 6—6 of FIG. 5; and

FIG. 7 is a top plan view of the spring of the arrangement of FIGS. 5 and 6.

DESCRIPTION OF THE PREFERRED EMBODIMENTS

Referring to FIGS. 1, 2, 3 and 4, which illustrate one embodiment or arrangement of the invention, there is shown a portion of a microscope, indicated generally at 10, which may be of any suitable well-known type. The microscope includes a frame 12, objective lenses, indicated generally at 14, and a stage or table 16. In order to avoid confusion in terminology, the present invention will be termed herein "a stage," which is indicated generally at 20. The stage includes a stage plate 22 of any suitable material. For example, a clear plastic such as acrylic may be used, such material being practically unbreakable. The stage plate is attached to the table 16 of the microscope by means of strips of double-faced adhesive tape 24, the strips being arranged transversely relative to the stage plate. Other means may be used for attaching the stage plate to the table of the microscope and the double-faced adhesive tape may be otherwise arranged, or there may be a different number of such strips.

There are a pair of upstanding pivot pins 26 which are spaced apart longitudinally of the stage plate 22. Pins 26 extend through slots 28 in the top walls of respective recesses 32 in the stage plate 22, said recesses opening downwardly. Slots 28 and recesses 32 extend longitudinally of the stage plate, as best shown in FIG. 2.

Pins 26 have flanges 34 intermediate their ends, said flanges being of greater diameter than the width of the slots 28 and said flanges are slidable on the top surface of the stage plate 22. It is to be noted that the diameter of the pins 26 is somewhat less than the width of the slots 28 so that said pins are freely slidable in said slots.

The lower ends of the pins 26 extend into the upper part of the recesses 32 and there are leaf springs 38 secured to the lower ends of the respective pins 26 by means of screws 40 which are screwed into upwardly-extending, tapped bores, not shown, in the pins 26. Leaf springs 38 extend radially of their respective pins and longitudinally of the respective recesses 32. There is an arcuate free end portion at each end of the springs 38 with the curved parts 42 of said end portions frictionally engaging the underside of the top wall 30. Thus, the pins 26 may be adjustably moved in their respective slots 28 and will be frictionally held in adjusted positions. It is to be noted that the lower ends of the pins 26, their springs, and the screws 40 securing the springs to the pins are within their respective recesses 32.

The pins 26 are adapted to be received in an axial opening provided therefor in specimen or sample plates, indicated generally at 46. A plate of this character is disclosed in the application of John J. Grubb, Keichi Tomei and Elwood F. Blondfield for APPARATUS FOR SAMPLES FOR MICROSCOPIC EXAMINATION, filed Apr. 19, 1971, Ser. No. 135332.

The specimen plate 46 has a plurality of annularly-arranged and spaced areas 48 which, when the plate 46 is disposed on a pin 26, may be brought into operable relationship with an objective lens 14 of the microscope. This is effected by rotating the specimen or sample plate on the pin 26.

With this arrangement, respective areas 48 may be brought into operable relationship with the microscope lens to provide a uniform coverage of the microscope field with every specimen receiving equal coverage. Should it be desired to cover a greater area of the microscope field, the operator may apply suitable pressure on the specimen or sample plate so as to move the pin 26 longitudinally in its slot 28 and the pin and plate 46 will be frictionally held in adjusted positions. When the end portions of the slot 28 extending beyond the flange 34 are substantially equal sized, the pin 26 will be substantially centered lengthwise of the slot. Normally, the pin will be centered within the slot. The specimen plate on the pin is rotated to bring the various areas 48 into alignment with the lens being used. As described above, the specimen plate and the pin on which it is disposed may be moved lengthwise relative to the slot to bring various parts of the area 48 being viewed by the operator.

Referring to FIGS. 5, 6 and 7, there is shown an alternative stage arrangement. There is a stage plate 60 similar to the stage plate 22 which has an opening 62 for the passage of light, the stage plate 22 having a similar opening which is not shown in FIGS. 1, 2, 3 and 4. This opening is positioned so that light will pass therethrough to illuminate any of the areas 48 that are in alignment with the particular lens or lens system in position to examine specimens on such areas.

Plate 60 has a pair of recesses 64 which are similar to the recesses 32, there being a pair of recesses disposed at opposite sides of the opening 62. The top walls of the recesses 64 are indicated at 66 and there is an axial opening in each of the walls 66, said openings being of greater diameter than the diameter of the pivot pins 68 which are similar to the pivot pins 26 of the arrangement shown in FIGS. 1 – 4. Each of the pins 68 has a flange 70 intermediate its ends. At the lower end of the pin 68 there is a washer 72 spaced downwardly from the flange 70. Washer 72 is secured to the pin by any suitable means such as, for example, a press fit. Between the flange 70 and washer 72 is, what is termed herein, a spring, indicated generally at 76. This spring is made of silicone rubber, this material being flexible and resilient. Spring 76 has a plurality of U-shaped cutouts 78 spaced annularly apart and leaving a series of arms 80 which are annularly spaced apart, the outer ends of said arms being arcuate and part of a circle having an axial opening 82 through which the pin 68 extends. The arcuate ends 82 of the arms 80 frictionally engage the cylindrical wall 84 of the recess 64. The central portion of the spring 76 is held between the washer 72 and the flange 70. The bottom of the recess 64 is closed by a cover plate 86 secured to the underside of the stage plate by screws 88.

With this arrangement, each of the pivot pins 68 is axially positioned in its opening 90. Since the diameter of the opening 90 is greater than the pin 68, the latter may be moved in any direction relative to its axis and the axis of the spring. Such movement is effected by the operator applying pressure to the specimen plate on said pin 68 in the desired direction. Thus, various parts of the sample-holding area may be brought into the field of the microscope lens.

When using the sample plate, there is a ring-shaped cover 94 that covers all of the sample areas 48.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example, and we do not wish to be restricted to the specific forms shown or uses mentioned, except as defined in the accompanying claims.

I claim:

1. A stage for microscopes including viewing lens means and a table, comprising
   a stage plate mounted on said table and having
   a. at least one generally elongated recess
   b. a top wall for said recess, said wall having an elongated opening therethrough;
   a pivot pin in said recess and extending upwardly through said opening and upwardly of the top surface of said stage plate and adapted to receive a specimen plate with specimen areas thereon, said pivot pin engaging a pivot hole in said specimen plate, said opening in said top wall being of sufficiently greater size than said pin to permit said pin being moved about in said opening upon the application of lateral pressure to the specimen plate for aligning specimen areas with said viewing lens means; and resilient leaf spring means in said recess, said resilient means being mounted on and connected to said pin and extending longitudinally of said recess and having portions thereof frictionally engaged with and slidable on the top wall of said recess, said pin being held in position by said resilient means and freely movable by said specimen plate in at least opposite directions in said opening from a central position when said specimen plate is laterally moved relative to said stage plate, said spring means retaining said pin and specimen plate in any adjusted position.

2. The invention defined by claim 1, wherein said stage plate has a light transmitting opening therein intermediate its ends and spaced from the opening in the top wall of the recess.

* * * * *